United States Patent
Hanmann et al.

(10) Patent No.: US 6,408,357 B1
(45) Date of Patent: Jun. 18, 2002

(54) DISK DRIVE HAVING A CACHE PORTION FOR STORING WRITE DATA SEGMENTS OF A PREDETERMINED LENGTH

(75) Inventors: Jonathan Lee Hanmann, Anaheim; Marcus C. Kellerman, Aliso Viejo, both of CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 09/232,746

(22) Filed: Jan. 15, 1999

(51) Int. Cl.$^7$ ............................................. G06F 12/00
(52) U.S. Cl. ...................... 711/113; 711/136; 711/129; 711/171; 711/173
(58) Field of Search ................................ 711/113, 135, 711/136, 133, 119, 129, 170, 171, 172, 173, 111, 112

(56) References Cited

U.S. PATENT DOCUMENTS

| | | | |
|---|---|---|---|
| 5,499,354 A | * 3/1996 | Aschoff et al. | ............. 711/129 |
| 5,642,501 A | 6/1997 | Doshi et al. | |
| 5,680,573 A | * 10/1997 | Rubin et al. | ............. 711/129 |
| 6,061,763 A | * 5/2000 | Rubin et al. | ............. 711/129 |

* cited by examiner

*Primary Examiner*—Matthew Kim
*Assistant Examiner*—Matthew D. Anderson
(74) *Attorney, Agent, or Firm*—Milad G Shara, Esq (57) ABSTRACT

A disk drive having a cache memory and a method of operating same, in which the disk drive is connectable to a host computer for reading and writing data on a disk. The method defines a length parameter specifying the length of a data segment to be written to the disk. A first portion of the cache memory stores data segments whose length is equal to the length parameter and a second portion of the cache memory stories data segments whose length is not equal to the length parameter. When a host write command including a write data segment having a write command length is received, the write data segment is storied in the first portion if the write command length is equal to the length parameter and stored in the second portion if the write command length is not equal to the length parameter. Write data segments stored in the first portion may be overwritten and the writing thereof to disk may be delayed according to a predetermined delayed writing policy. In this manner, disk write and access latencies are decreased, particularly for repetitive and identically-sized writes, such as may occur when the drive is called upon to carry out frequent updating of file allocation tables and like structures.

43 Claims, 3 Drawing Sheets

DISK DRIVE HAVING A CACHE PORTION FOR STORING WRITE DATA SEGMENTS OF A PREDETERMINED LENGTH

BACKGROUND OF THE INVENTION

1. Field of the Invention

The present invention relates to data storage devices and methods. More particularly, the present invention relates to a disk drive having a cache memory and to a method of optimizing the operating of such a cache memory.

2. Description of the Prior Art and Related Information

Disk drives typically communicate with host computers via standardized interfaces. One such standardized interface is the Integrated Drive Electronics (IDE) interface, sometimes referred to as the AT attachment (ATA) interface. The IDE interface was originally based upon the IBM PC AT 16-bit bus standard, although most disk drives today utilize an enhanced version of the standard, which may be called EIDE or ATA-n where n represents a generation of the standard which has been documented in a standards committee. In the IDE or EIDE or ATA interfaces (hereafter collectively IDE), the disk drive controller is built into the logic board of the disk drive. The IDE standard allows for the presence of a cache memory in the disk drive controller to temporarily store data being transferred to and from the host computer system. Cache memories allow disk drives to temporarily store data, likely to be requested by the host computer, in a semiconductor memory. The latencies associated with semiconductor memories are orders of magnitude smaller than the latencies inherent in mechanically accessing data stored on a rotating disk. Therefore, retrieving data from the cache memory rather than from disk allows for a faster retrieval of needed data and thus leads to more efficient use of processor resources.

In IDE and other interface standards, the smallest indivisible unit addressable on a disk is a logical block (512 bytes), and each such logical block is assigned a Logical Block Address (LBA). When the operating system of the host computer sends a command to the disk drive, the nature of the command is specified (read, write), along with the LBA and the count, specifying the number of contiguous logical blocks to be transferred. To keep track of where data is stored on the disk or disks, the file system of the operating system often maintains a logical structure specifying the location of each file stored on the disk. This logical structure is often called a File Allocation Table (FAT), each entry of which points to the start of a file stored on the disk or to the next cluster of the file if the file is larger than one cluster. Typically, the disk is written to in groups of blocks by specifying the LBA of the first block and the count, or number of subsequent contiguous blocks. Different operating systems specify a different number of blocks to update the FAT. For example, the Microsoft Windows 95 and 98® operating systems specify a 1-block write to update the FAT, while the Windows NT® operating systems specifies an 8-block FAT update.

To more efficiently utilize the available cache memory, it is known to divide a disk drive cache memory into one or more logical segments and to further set up one or more of these logical segments as ring (circular) buffers for temporary storage of read or write data. Also known are adaptive cache management methods wherein cache logical segments are allocated and managed according to whether the data is sequential, random or repetitive, as disclosed in commonly assigned U.S. Pat. No. 6,092,149, entitled "DISK DRIVE CACHE SYSTEM USING A DYNAMIC PRIORITY SEQUENTIALLY STREAM OF DATA SEGMENTS CONTINUOUSLY ADAPTED ACCORDING TO PREFETCHED SEQUENTIAL, RANDOM, AND REPORTING TYPES OF ACCESSES" (as amended)" issued on Jul. 18, 2000, in the names of M. Hicken; S. Howe; D. Sokolov; T. Swatosh and J. Williams, the disclosure of which is hereby incorporated herein by reference.

However, such segmentation, although highly effective in enhancing (i.e., speeding up) drive operations under certain operative conditions, may nevertheless be somewhat less effective under certain other conditions. One such condition, for example, is that of repetitive FAT updates. In the Windows 95 (using a 16-bit FAT or FAT16) or 98® (using a 32-bit FAT or FAT32) environment, the FAT updates manifest themselves as 1-block writes, whereas in a Windows NT® environment, such FAT updates consist of 8-block writes. Such FAT updates may not make the most efficient use of available cache memory resources. For example, when a 1-block write is performed to update the FAT, an entire multi-block logical segment is typically used, resulting in wasted cache space. Indeed, as the logical segments typically are greater than 1 logical block, a 1-block write to a logical segment renders the remaining blocks within that logical segment inaccessible and thus unavailable to subsequent writes. Moreover, in the case of FAT updates, the actuator on which the disk read-write heads are disposed must repetitively sweep across the radial width of the disk to write the data and to update the FAT, as the FAT is typically located at one end of the disk whereas the corresponding data is typically spread over a wide area. Such repetitive FAT updates limit the performance of the drive by causing the actuator to repeatedly sweep across the disk, and may decrease the performance of the host processor as it sits idle, waiting for requested data or for confirmation that the data has indeed been written to disk.

One commonly accepted means of measuring the performance of computer systems is by testing the drive against industry-standard benchmark programs, such as the Winbench series of programs developed by Ziff-Davis, Inc. Such benchmark programs attempt to simulate the demands of typical applications and to measure the disk performance during the simulation. In the process of analyzing the disk access patterns during the operation of such benchmark programs, numerous instances of single-block writes were observed, interspersed with other operations pertinent to the operation of the benchmark. Further investigations revealed that the vast majority of the single-block writes were made for the purpose of updating the FAT and that many overwrites of the same logical block occurred. Such repetitive single block writes to update the FAT, moreover, were found to degrade the performance of the drive, as measured by the benchmark program. As the benchmark programs are designed to simulate the normal operation of typical software applications, it is expected that such repetitive FAT updates observed during the operation of the benchmark programs similarly degrade disk performance in real world situations. Moreover, the problems associated with repetitive single-block writes are not confined to the Windows 95 or 98® operating systems, but are also present in the eight-block writes to update the FAT in the Windows NT® operating system. Other operating systems may also experience similar degradation in performance due to repetitive low block count writes. Such repetitive, low block count writes may be carried out for the purpose of updating a file system or for some other wholly unrelated purpose. There is, therefore, a need for methods and devices to mitigate the effects of such performance degrading repetitive single-block and low block count writes both during the execution of benchmark programs as well as during normal operation of the drive.

SUMMARY OF THE INVENTION

An object of this invention, therefore, is to enhance the performance of disk drives by providing means and methods to mitigate the effects of such performance degrading repetitive single-block and low block count writes to cache memory.

Accordingly, this invention can be regarded as a method of operating a disk drive having a cache memory wherein the disk drive is connectable to a host computer for reading and writing data on a disk. The method comprises the steps of defining a length parameter specifying the length of a data segment to be written to the disk; defining a first portion of the cache memory for storing a data segment whose length is equal to the length parameter and defining a second portion of the cache memory for storing a data segment whose length is not equal to the length parameter. The method further comprises the steps of receiving a host write command including a write data segment having a write command length; storing the write data segment in the first portion if the write command length is equal to the length parameter and storing the write data segment in the second portion if the write command length is not equal to the length parameter.

According to farther embodiments, the disk drive may provide status to the host computer indicating completion of the write command when the data segment is stored in the cache. The length of the data segment may be defined as a quantity of logical blocks. The disk drive may delay writing the data segment on the disk according to a predetermined delayed writing policy. Such delayed writing policy may comprise delaying for a predefined time interval before writing the data segment to the disk, writing the data segment to the disk when the first portion of the cache is full and/or writing the data segment to the disk based on a Least Recently Used (LRU) algorithm. The write data segment stored in the first portion may be overwritten before being written to the disk by a data segment specifying the same address as the overwritten data segment. A step of logically dividing the first cache portion into multiple sub-portions each adapted to storing data segments whose write command length is equal to the defined length parameter may also be carried out. An indexed address range may be defined for each sub-portion, The host computer may provide a command to define the length parameter and/or the disk drive may read the length parameter from a reserved disk area.

In another aspect thereof, the present invention may be regarded as a computer system comprising a host computer and a disk drive. The disk drive includes a disk controller connected to the host computer and controlling an operation of the disk drive; a disk having a recording surface for recording data thereon; an actuator connected to the disk controller and including a read-write head to read and write data to the disk and a cache memory connected to the readwrite head. The cache memory includes a first cache portion for storing a data segment whose length is equal to a length parameter that specifies a length of a data segment to be written to the disk and a second cache portion for storing a data segment whose length is not equal to the write length parameter. The disk controller is adapted to receive a host write command including a write data segment having a write command length and to store the write data segment in the first portion if the write command length is equal to the length parameter and to store the write data segment in the second portion if the write command length is not equal to the length parameter.

According to further embodiments, locations in the first portion of the cache memory may be indexed on a one to one basis with corresponding locations on the disk. Means for determining whether the write command length of each data segment of each host write command is equal to the length parameter may also be provided. The disk drive may further comprise means for providing status to the host computer indicating completion of the write command when the data segment is stored in the cache. The length of the data segment may be defined as a quantity of logical blocks. The disk drive may further comprise means for delaying writing the data segment on the disk according to a predetermined delayed writing policy. The delayed writing policy may comprise delaying for a predefined time interval before writing the data segment to the disk, writing the data segment to the disk when the first portion of the cache is full and/or writing the data segment based on a LRU algorithm. The write data segment stored in the first portion may be overwritten before being written to the disk. The disk drive may further comprise means for overwriting the data segment by a data segment specifying the same address as the overwritten data segment. The first cache portion may be logically divided into multiple sub-portions each adapted to storing data segments whose write command length is equal to the defined length parameter. Each such sub-portion may be assigned an indexed address range. The length parameter may be provided by a command from the host computer and/or may be stored in a reserved disk area.

The foregoing and other features of the invention are described in detail below and set forth in the appended claims.

DETAILED DESCRIPTION

Figure 1:
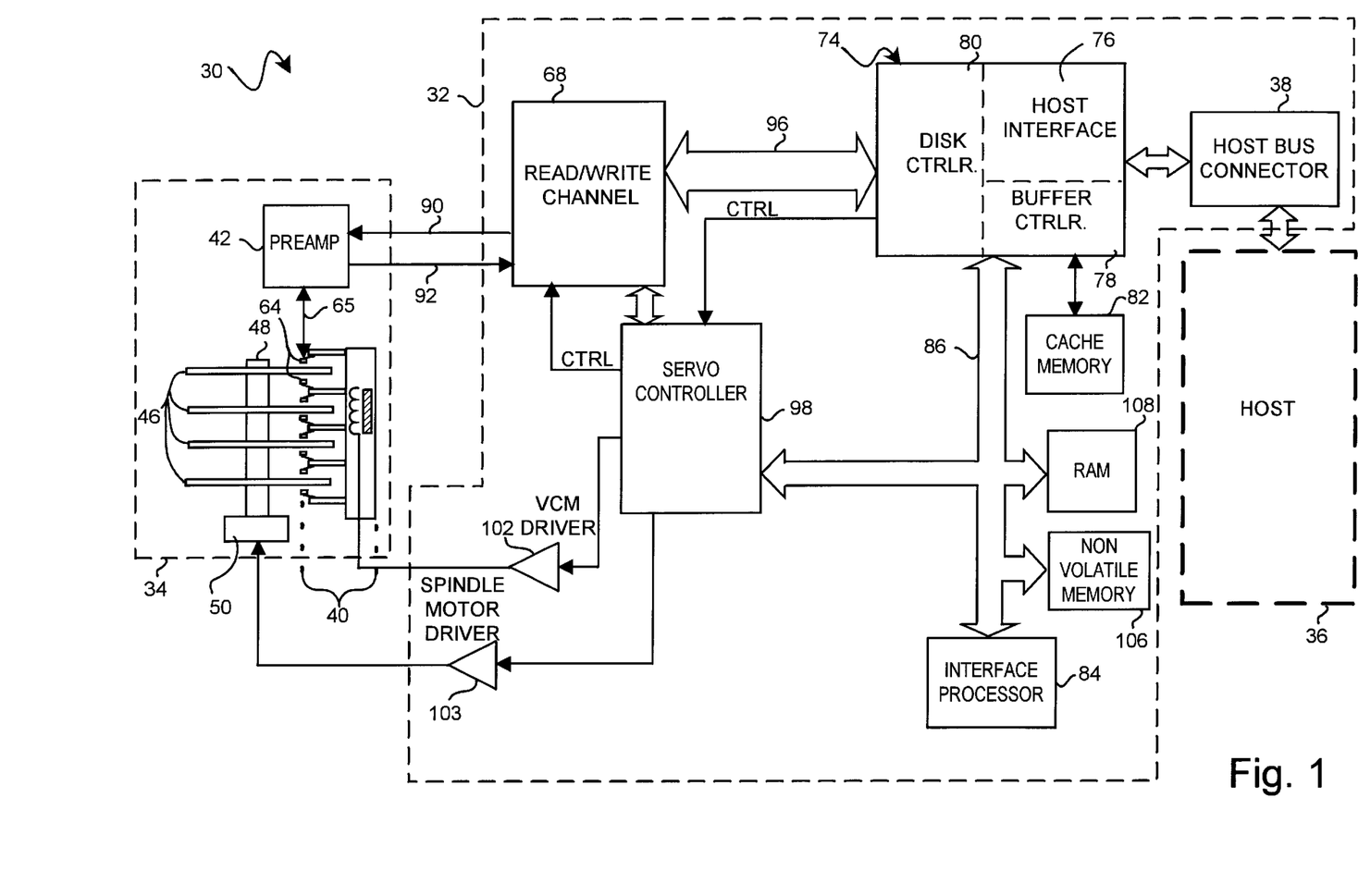
FIG. 1 is a block diagram of a disk drive in which the methods of the invention may be practiced.

FIG. 1 shows a block diagram of a disk drive 30 in which the invention may be practiced. Disk drive 30 is connected to a host computer 36 via host bus connector 38 for the transfer of commands, status and data. One suitable standard for such connection is the EIDE standard presently favored for desktop personal computers. Disk drive 30 comprises a Head/Disk Assembly (HDA) 34, and a controller printed circuit board assembly (PCBA) 32.

HDA 34 comprises one or more disks 46 for data storage, a spindle motor 50 for rapidly spinning each disk 46 (four shown) on a spindle 48, and an actuator assembly 40 for swinging a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller (HIDC) 74, voice coil motor (VCM) driver 102, spindle motor driver 103, interface microprocessor 84, and several memory arrays, including cache memory buffer 82, random access memory (RAM) 108, and non-volatile memory 106.

Host-initiated operations for reading and writing data in disk drive 30 are executed under control of microprocessor 84 connected to the controllers and memory arrays via a bus 86. Program code executed by microprocessor 84 is stored in non-volatile memory 106 and RAM 108. Program overlay code stored on reserved tracks of disks 46 may also be loaded into RAM 108 as required for execution. In particular as described in detail below, microprocessor 84 executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, the HIDC provides digital data over the NRZ bus to channel 68 that encodes the data prior to its transmittal to preamplifier 42. Preferably, channel 68 employs partial response maximum likelihood (PRML) detection techniques, although the invention may be practiced with equal advantage using other detection processes.

The HIDC 74 comprises a disk controller 80 for formatting and providing error detection and correction of disk data, a host interface controller 76 for responding to commands from host 36, and a buffer controller 78 for storing and retrieving data which is transferred between disks 46 and host 36 via cache memory 82. Collectively, the controllers in the HIDC 74 provide automated functions that assist the microprocessor 84 in controlling disk operations.

A servo controller 98 provides an interface between the microprocessor 84, the actuator assembly 40 and the spindle motor 50. Microprocessor 84 commands logic in servo controller 98 to position actuator 40 using VCM driver 102 and to precisely control the rotation of spindle motor 50 with spindle motor driver 103. Servo controller 98 also receives embedded servo positioning information via channel 68 to enable control of a positioning servo loop with firmware in microprocessor 84.

According to the present invention, the cache memory 82 is "tuned" or optimized to the requirements of the operating system managing the resources of the host computer 36. In particular, the present invention allocates a portion of the cache 82 to exclusively store data segments of host write commands having a length that is equal to a predefined length parameter that may, in one embodiment of the present invention, be equal to the length of a FAT update. Indeed, such data segments having a length equal to the length of a FAT update are stored in the allocated portion of the cache memory, irrespective of the LBA of the write operation, the count of the host write command being the only criterion for writing the data segment to the allocated portion of the cache 82. According to a further embodiment of the present invention, such data segments are not immediately written from the cache 82 to the disk 46. Instead, the writing of these data segments stored in the allocated portion of the cache memory 82 is delayed, to allow for multiple updates (overwrites) of the same logical block.

According to an illustrative embodiment of the present invention, therefore, to optimize cache usage for the 1-block writes characteristic of FAT updates in the Windows 95 or 98® operating systems, for example, a portion of the cache 82 may be allocated to exclusively store data segments of host write commands that are one block in length. Therefore, any and all host write commands that specify a one block data segment write, whether they are FAT updates or not, may be stored in the portion of the cache 82 allocated therefor. Similarly, to optimize cache usage for the 8-block writes characteristic of FAT updates in the Windows NT® operating system, for example, a portion of the cache 82 may be allocated to exclusively store data segments of host write commands that are eight blocks in length. The present invention, however, is not limited to operating systems utilizing a 1-block or an 8-block FAT updating scheme. Indeed, the present invention finds utility in any environment where frequent and/or repetitive and identically-sized writes occur, whether these writes are intended to update a file system allocation table, or for some other purpose unrelated to FAT updates.

Figure 2:
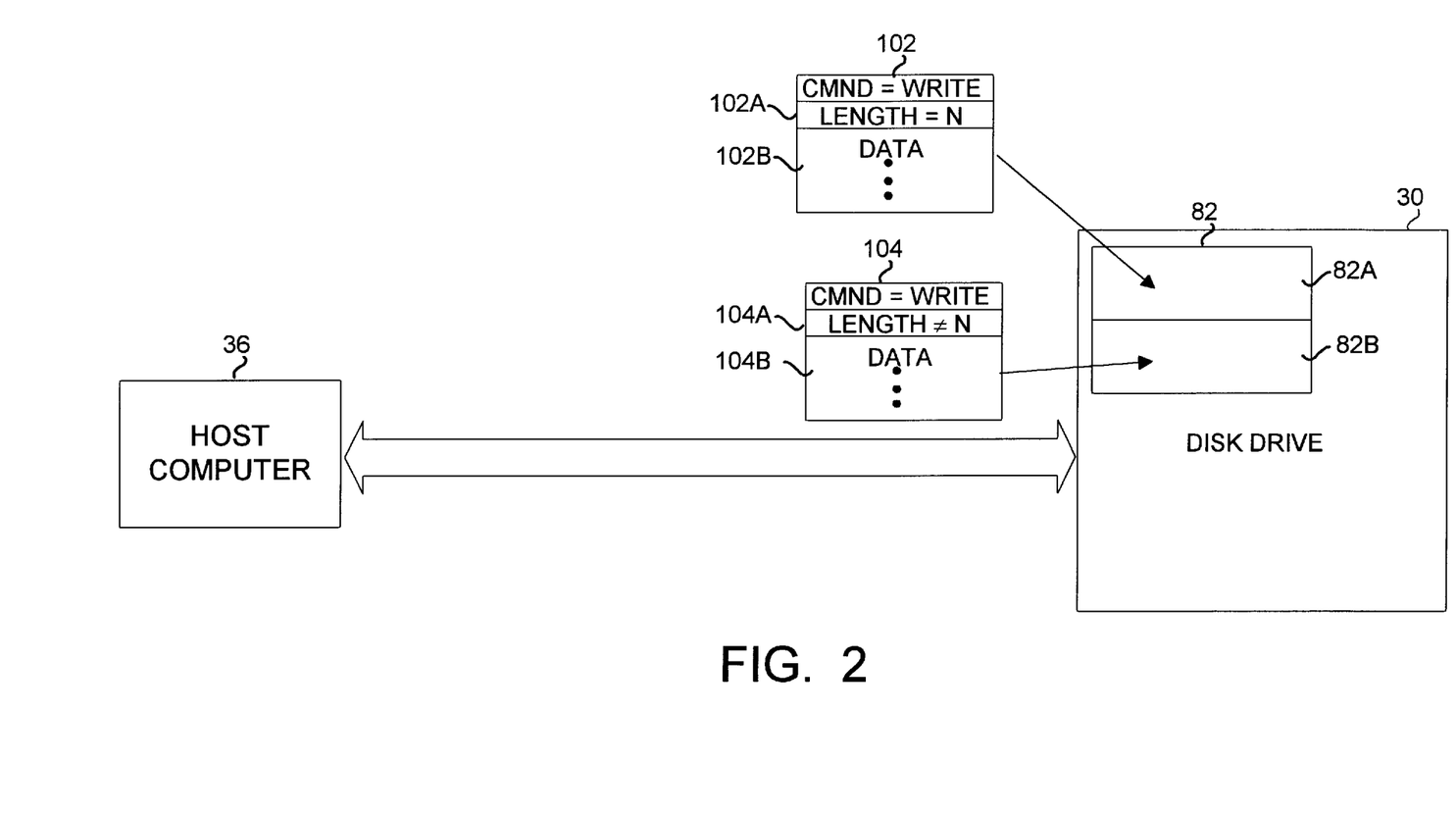
FIG. 2 is a block diagram of a disk drive and of a computer system integrating such a disk drive, according to an embodiment of the present invention.

FIG. 2 is a block diagram of a disk drive and computer system according to an embodiment of the present invention. As shown therein, the host computer 36 is connected to the disk drive 30 via a host bus connector, such as shown at reference numeral 38 in FIG. 1. The disk drive 30 includes a cache memory 82, as also shown in FIG. 1. According to the present invention, the cache memory 82 is logically partitioned in at least two portions for storage of host write command data; namely, a first portion 82A and a second portion 82B. As is well known in the art, other portions of the cache are partitioned and allocated for storage of data responsive to host read commands. Preferably, the first portion 82A of the cache memory 82 stores write data segments 102B of host write commands 102 (abbreviated "CMND=WRITE" in FIG. 2) that have a write command length 102A equal to a predetermined length parameter e.g. N. Similarly, the second portion 82B of the cache memory 82 stores write data segments 104B of host write commands 104 that have a write command length that is not equal to the predetermined length parameter e.g. not N. The operation of the disk drive, computer system and method according to the present invention will now be described with further reference to FIG. 3.

Figure 3:
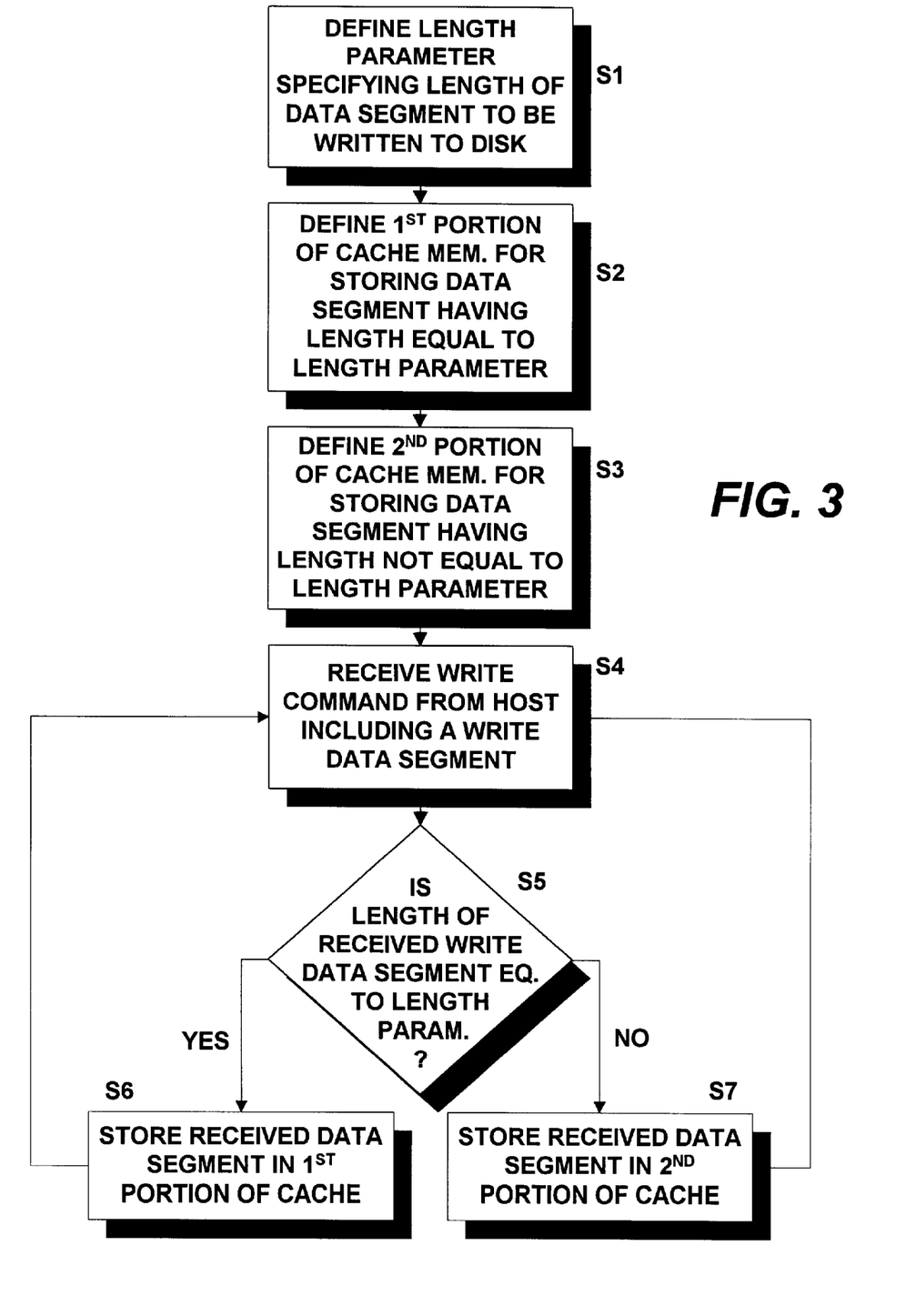
FIG. 3 is a flowchart of a method of operating a disk drive having a cache memory, according to an embodiment of the present invention.

FIG. 3 is a flowchart of the method of operating a disk drive having a cache memory, according to an embodiment of the present invention. Considering now FIGS. 2 and 3 collectively, the aforementioned length parameter is defined in step S1, thereby specifying the length of the data segment to be written to the disk. The length of the data segment, according to an embodiment of the present invention, may be defined as a quantity of logical blocks. For example, to "tune" the drive to an operating system that routinely carries out repetitive single-block writes to update a FAT, for example, the length parameter may be defined as a one-block length parameter i.e. the length parameter may be one block (512 bytes, for example) in length. Similarly, the length parameter may be defined as eight blocks or some other length, depending upon the observed behavior of the operating system running on the attached host computer 36.

In steps S2 and S3, the cache memory 82 is logically partitioned into at least two portions 82A and 82B for storing write command data segments. The purpose of the first portion 82A of the cache memory 82 is to store data segments (of host write commands issued from the host computer 36) whose length is equal to the length parameter defined in step S1. The purpose of the second portion 82A of the cache memory 82 is to store data segments whose length is not equal to the length parameter defined in step S1. A host write command 102, 104 is received in step S4, the host write command 102, 104 including a respective write data segment 102B, 104B, respectively. The write data segment 102B, 104B has a respective write command length 102A, 104A, which may be equal to the length parameter defined in step S1 or different therefrom. The write command length 102A, 104A of the write data segment 102B, 104B is then compared to the defined length parameter in step S5. If the write command length 102A, 104A of the write data segment 102B, 104B is equal to the defined length parameter, the write data segment is stored in the first portion 82A of the cache memory 82, as called for in step S6. If, however, the write command length of the write data segment 102B, 104B is not equal to the defined length parameter, the write data segment is stored in the second portion 82B of the cache memory 82, as shown in step S7. After either steps S6 or S7, the method according to the present invention may return to step S4 (possibly after some intervening steps), to receive and process further host write commands 102, 104 from the host computer 36.

After each of the steps S6 and S7, the method according to the present invention may include a step of providing a status to the host computer 36 to indicate completion of the write command 102, 104 when the data segment 102B, 104B is stored in either the first portion 82 A or the second portion 82B of the cache memory 82. This status may be sent to the host computer 36 after either of the steps S6 or S7 even though the write data segment 102B, 104B may not yet have been written to the disk 46. In this manner, the status indicating completion of the write command 102, 104 may be given to the host computer 36 well in advance of the seek time necessary to mechanically swing the actuator arm 64 to the appropriate portion of the disk 46 to write the received data segment to the disk 46.

Common benchmark programs, such as the Winbench series of benchmarks, have been observed to carry out repetitive and identically-sized block writes (having a length parameter of, for example, 1 block) to the same LBA, without carrying out any intervening reads of the data segments written. To further optimize the operation of the drive 36, and thus optimize the operation of a computer system comprising such a drive, the present invention allows these write data segments that have identical write command lengths, that specify the same LBA and that are stored in the first portion 82A of the cache memory 82 to be overwritten one or more times before being written to disk. This reduces the number of times the actuator 64 must traverse the disk 46 to write the same data segment to the same LBA. In turn, this increases the performance (i.e., speed) of the drive, particularly when the status indicating completion of the write command is given to the host computer 36 after each overwrite and before the segment is written to disk.

Having provided good status to the host computer 36, and having allowed potentially multiple overwrites of the same data segment, the overwritten data segment must eventually be written to the disk 46 in order to maintain the coherency of the data on the disk, in the cache 82 and in the operating system. However, according to the present invention, the disk drive 30 may selectively delay writing the data segment to the disk(s) 46 according to a predetermined delayed writing policy. According to an embodiment of the present invention, the predetermined delayed writing policy may include delaying writing the data segment to disk for a predetermined time interval before writing the data segment to the disk(s) 46. The predetermined time interval may be dependent or independent of the current activity level of the drive. For example, the predetermined interval may depend upon the activity level of the drive and the drive 30 may flush (write) the data segments 102B stored in the first portion 82A of the cache 82 after a first predetermined period of time during which the drive has been idle. For example, whenever the drive has been idle for a first predetermined time period (20 ms, for example), the first portion 82A of the cache memory 82 may be flushed in an optimized manner by invoking an idle flush mechanism. The idle flush mechanism may be caused to stop or suspend operation whenever a new host command is received from the host computer 36, to allow for a faster host response time. When the host computer 36 keeps the drive very busy with other activities, such as multiple reads, the idle flush mechanism cannot be invoked, and data might theoretically be lost. To address this possibility and to prevent any loss of data, the predetermined time interval may also include a component that is independent of the current activity level of the drive. Indeed, to ensure that data segments in the first portion 82A of the cache memory 82 do not get lost when the drive is very busy and when the idle flush mechanism is prevented from operating, a second predetermined time interval may be set, after which the host is instructed to suspend further reads or writes to the drive 30 until the data segments in the first portion 82A of the cache memory 82 is written to the disk or disks 46. For example, to ensure that data segments written to the first portion 82A do not get lost when the drive 30 is very busy, a second timer (set at 5 seconds, for example) may be employed, after which the host computer 36 is held off for a short period of time (such as 0.5 seconds, for example) to allow the data segments 102B stored within the first portion 82A of the cache memory 82 to be written to the disk(s) 46.

The predetermined delayed writing policy, according to a further embodiment, may also include writing the data segment or segments 102B stored in the first portion 82A to the disk 46 when the first portion 82A of the cache memory 82 is full or when the first portion 82A has reached a predetermined and/or selectable percentage of its overall storage capacity. According to a still further embodiment, the delayed writing policy may include writing the data segment 102 or data segments 102 stored in the first portion 82 based upon a Least Recently Used (LRU) algorithm or based upon a variation thereof. It is to be understood that the predetermined delayed writing policy need not be based upon any single criterion, but may instead advantageously be based upon a combination of any or all of the aforementioned delayed writing policies and/or variations thereof For example, the first portion 82A of the cache 82 may be flushed upon expiration of a first time period during which the host computer 36 or the drive 30 has been idle, and the flushing may be further optimized by carrying out the writing to disk according to an LRU algorithm. In addition, a further criterion or criteria may take precedence over the first time period, in that the first portion 82A may be flushed if it becomes full or reaches a predetermined and selectable percentage of its overall capacity before the first time period has elapsed.

In another embodiment, the data segment may be flushed to the disk on the basis of the current rotational position of the disk. For example, if as a result of normal operations the head is about to pass over a block location or plurality of block locations, and there is data in the cache which is "dirty" i.e. not yet written to the disk, the disk control firmware may cause the data to be written when the designated block location is passing under the head. This insures the coherence of data on the disk without necessarily incurring any access time penalty.

Other such combinations and/or variations for the timing and manner of flushing (writing to disk) of the data segments stored in the first portion 82A of the cache memory 82, and all such combinations and/or variations are deemed to fall within the scope of the present invention.

The size (number of available spaces for data segments having the defined length parameter) of the first portion 82A may depend upon the size of the cache 82 or may be set to an appropriate number. In one illustrative embodiment of the present invention, the first portion 82A stores 32 single-block data segments and is mapped on a one-to-one basis with physical locations on the disk 46. The criterion for storing data segments in such a 32-space first portion 82A is the command-specified length; namely, the number of blocks of the data segment. In this embodiment, the count criterion for storage of data segments in the first portion 82A is a 1-block criterion. In the second portion 82B of the cache memory 82, therefore, the storage criterion is that the length of the data segment is other than one block in length. The minimum block space allocation for the second portion 82B, in this embodiment, is 8 blocks, termed a cluster, although the cluster size may readily be adapted to the requirements at hand. For example, the cluster size may be increased to 64 blocks, 128 blocks or any suitable number of blocks. One possible flushing mechanism may specify that when all 32 of the single-block spaces within the first portion 82A of the cache memory 82 are fill, the data segments stored in the first portion 82A are written to disk at least four segments at a time, for example. An aging or an LRU algorithm may be employed to decide which four segments within the first portion 82A should be flushed first. If the host computer 36 specifies a write of a one block data segment 102B that is already stored in the first portion 82A of the cache memory 82, a write hit has occurred and the corresponding single block data segment stored in the first portion 82A is simply overwritten with the new copy of the one block data segment from the host write command.

According to still further embodiments of the present invention, the first portion 82A may be logically divided into multiple sub-portions each adapted to storing data segments whose write command length is equal to the defined length parameter. In this case, each sub-portion may be assigned an indexed address range to correlate the sub-portions with corresponding physical addresses on the disk(s) 46. According to the present invention, to map the data segments stored in the first portion 82A to physical disk locations, a B-Tree (balanced hierarchy of address indexes) search may be employed, as is known in the data storage arts.

According to the present invention, the length parameter defined in step S1 of FIG. 3 may be provided as a command from the host computer 36, and the first portion 82A of the cache memory may be defined based thereon. For example, the host computer 36 may itself define the length parameter to be eight blocks to accommodate, for example, the 8-block FAT update specified by Windows NT®. In that case, first portion 82A of the cache memory 82 may be defined so as to allow a predetermined number of such 8-block writes to be stored therein. Alternatively, according to a further embodiment of the present invention, the disk drive 30 may itself read the length parameter from a reserved area of the disk. Alternatively still the disk drive 30 may monitor the pattern of writes to the disk and adaptively define two or more portions (such as shown at 82A and 82B in FIG. 3) of the cache memory 82 to optimally store write data segments having predetermined length parameters. For example, the drive 30 according to the present invention may monitor the length of the data segments of the host write commands. Upon monitoring a pattern of repeated and identically-sized writes, the disk drive 30 may dynamically allocate a dedicated portion (such as portion 82A) of the cache memory 82 to store these identically-sized data segments, and may write to and flush this dedicated portion according to one or more of the delayed writing methods disclosed herein. In any event, the defined length parameter of step S1 in FIG. 3 may be set to any length that is advantageous for the operating for the operating system managing the resources of the host computer 36.

While the foregoing detailed description has described preferred embodiments of the present invention, it is to be understood that the above description is illustrative only and not limiting of the disclosed invention. For example, the cache memory may be logically divided into further portions to accommodate frequent writing of data segments of lengths other than specifically described above. Similarly, other cache-flushing schemes may be implemented to optimally write the cached data to disk. Still other modifications may occur to those of skill in this art. The present invention, therefore, is to be limited only by the claims as set forth below.

We claim:

1. A method of operating a disk drive having a cache memory wherein the disk drive is connectable to a host computer for reading and writing data on a disk, the method comprising the steps of:

defining a length parameter specifying the length of a data segment to be written to the disk;

defining a first portion of the cache memory for storing a data segment whose length is equal to the length parameter;

defining a second portion of the cache memory for storing a data segment whose length is not equal to the length parameter;

receiving a host write command including a write data segment having a write command length;

storing the write data segment in the first portion if the write command length is equal to the length parameter;

storing the write data segment in the second portion if the write command length is not equal to the length parameter, and delaying writing the data segment on the disk according to a predetermined delayed writing policy.

2. The method of claim 1, wherein the disk drive provides status to the host computer indicating completion of the write command when the data segment is stored in the cache.

3. The method of claim 1, wherein the length of the write data segment is defined as a quantity of logical blocks.

4. The method of claim 1, wherein the delayed writing policy comprises delaying for a predefined time interval before writing the data segment to the disk.

5. The method of claim 1, wherein the delayed writing policy comprises writing the data segment to the disk when the first portion of the cache is full.

6. The method of claim 1, wherein the delayed writing policy comprises writing the data segment based on an LRU algorithm.

7. The method of claim 1, wherein the delayed writing policy comprises writing the data segment based on the current rotational position of the disk.

8. The method of claim 1, wherein the write data segment stored in the first portion is overwritten before being written to the disk.

9. The method of claim 8, wherein the data segment is overwritten by a data segment specifying the same address as the overwritten data segment.

10. The method of claim 1, further comprising the step of logically dividing the first cache portion into multiple sub-portions each adapted to storing data segments whose write command length is equal to the defined length parameter.

11. The method of claim 10, further comprising the step of defining an indexed address range for each sub-portion.

12. The method of claim 1, wherein the host computer provides a command to define the length parameter.

13. The method of claim 1, wherein the disk drive reads the length parameter from a reserved disk area.

14. A computer system, comprising:
 a host computer;
 a disk drive, including:
  a disk controller connected to the host computer and controlling an operation of the disk drive;
  a disk having a recording surface for recording data thereon;
  an actuator connected to the disk controller and including a read-write head to read and write data to the disk;
  a cache memory connected to the read-write head, the cache memory including:
   a first cache portion for storing a data segment whose length is equal to a length parameter that specifies a length of a data segment to be written to the disk;
   a second cache portion for storing a data segment whose length is not equal to the write length parameter, wherein the disk controller is adapted to receive a host write command including a write data segment having a write command length and to store the write data segment in the first portion if the write command length is equal to the length parameter and to store the write data segment in the second portion if the write command length is not equal to the length parameter, and
  means for delaying writing the data segment on the disk according to a predetermined delayed writing policy.

15. The computer system according to claim 14, wherein locations in the first portion of the cache memory are indexed on a one to one basis with corresponding locations on the disk.

16. The computer system according to claim 14, further comprising means for determining whether the write command length of each data segment of each host write command is equal to the length parameter.

17. The computer system of claim 14, wherein the disk drive further comprises means for providing status to the host computer indicating completion of the write command when the data segment is stored in the cache.

18. The computer system of claim 14, wherein the length of the data segment is defined as a quantity of logical blocks.

19. The computer system of claim 14, wherein the delayed writing policy comprises delaying for a predefined time interval before writing the data segment to the disk.

20. The computer system of claim 14, wherein the delayed writing policy comprises writing the data segment to the disk when the first portion of the cache is full.

21. The computer system of claim 14, wherein the delayed writing policy comprises writing the data segment based on an LRU algorithm.

22. The computer system of claim 14, wherein the delayed writing policy comprises writing the data segment based on the current rotational position of the disk.

23. The computer system of claim 14, wherein the write data segment stored in the first portion is overwritten before being written to the disk.

24. The computer system of claim 23, wherein the disk drive further comprises means for overwriting the data segment by a data segment specifying the same address as the overwritten data segment.

25. The computer system of claim 14, wherein the first cache portion is logically divided into multiple sub-portions each adapted to storing data segments whose write command length is equal to the defined length parameter.

26. The computer system of claim 25, wherein each sub-portion is assigned an indexed address range.

27. The computer system of claim 14, wherein the length parameter is provided by a command from the host computer.

28. The computer system of claim 14, wherein the disk drive further comprises a reserved disk area for storing the length parameter.

29. A computer system, comprising:
 a host computer;
 a disk drive, including:
  a disk controller connected to the host computer and controlling an operation of the disk drive;
  a disk having a recording surface for recording data thereon;
  an actuator connected to the disk controller and including a read-write head to read and write data to the disk;
  a cache memory connected to the disk controller, the cache memory including:
   a first cache portion for storing a data segment whose length is equal to a length parameter that specifies a length of a data segment to be written to the disk, locations in the first portion of the cache memory being indexed on a one to one basis with corresponding locations on the disk;
   a second cache portion for storing a data segment whose length is not equal to the write length parameter;
  wherein the disk controller is adapted to receive a host write command including a write data segment having a write command length and to store the write data segment in the first portion if the write command length is equal to the length parameter and to store the write data segment in the second portion if the write command length is not equal to the length parameter.

30. The computer system according to claim 29, further comprising means for determining whether the write command length of each data segment of each host write command is equal to the length parameter.

31. The computer system of claim 29, wherein the disk drive further comprises means for providing status to the host computer indicating completion of the write command when the data segment is stored in the cache.

32. The computer system of claim 29, wherein the length of the data segment is defined as a quantity of logical blocks.

33. The computer system of claim 29, wherein the disk drive further comprises means for delaying writing the data segment on the disk according to a predetermined delayed writing policy.

34. The computer system of claim 33, wherein the delayed writing policy comprises delaying for a predefined time interval before writing the data segment to the disk.

35. The computer system of claim 33, wherein the delayed writing policy comprises writing the data segment to the disk when the first portion of the cache is full.

36. The computer system of claim 33, wherein the delayed writing policy comprises writing the data segment based on an LRU algorithm.

37. The computer system of claim 33, wherein the delayed writing policy comprises writing the data segment based on the current rotational position of the disk.

38. The computer system of claim 29, wherein the write data segment stored in the first portion is overwritten before being written to the disk.

39. The computer system of claim 38, wherein the disk drive further comprises means for overwriting the data segment by a data segment specifying the same address as the overwritten data segment.

40. The computer system of claim 29, wherein the first cache portion is logically divided into multiple sub-portions each adapted to storing data segments whose write command length is equal to the defined length parameter.

41. The computer system of claim 40, wherein each sub-portion is assigned an indexed address range.

42. The computer system of claim 29, wherein the length parameter is provided by a command from the host computer.

43. The computer system of claim 29, wherein the disk drive further comprises a reserved disk area for storing the length parameter.

* * * * *